July 23, 1935.  H. E. HERSHEY ET AL  2,008,910

DISPATCHING SYSTEM

Filed July 13, 1931    8 Sheets-Sheet 1

Fig. 1

Inventors—
Harry E. Hershey
Alfred H. Balliveau

Walter Owen
Atty.

July 23, 1935.  H. E. HERSHEY ET AL  2,008,910
DISPATCHING SYSTEM
Filed July 13, 1931    8 Sheets-Sheet 2

Fig. 2

Inventors
Harry E. Hershey
Alfred H. Belliveau
Wm. Walter Owen.
Atty.

July 23, 1935.  H. E. HERSHEY ET AL  2,008,910

DISPATCHING SYSTEM

Filed July 13, 1931  8 Sheets-Sheet 3

Inventors
Harry E. Hershey
Alfred H. Bellhouse

Patented July 23, 1935

2,008,910

UNITED STATES PATENT OFFICE 2,008,910

DISPATCHING SYSTEM

Harry E. Hershey, Oak Park, and Alfred H. Belliveau, Chicago, Ill., assignors, by mesne assignments, to Associated Electric Laboratories, Inc., Chicago, Ill., a corporation of Delaware Application July 13, 1931, Serial No. 550,358

6 Claims. (Cl. 177—353)

The present invention relates in general to dispatching systems, but is particularly concerned in the provision of a dispatching system in which any number of field stations may be interconnected, by means of a single pair of line conductors, to a dispatcher's station.

Among the objects of the invention are, to provide a relatively simple system of circuits and apparatus, whereby a dispatcher may selectively perform operations in any field station, and wherein as a result thereof, apparatus at such field station will automatically send in a return indication to advise the dispatcher that the desired function has been performed.

Other features and objects comprise the provision of means for effectively locking out all other field stations and the dispatcher's station while any field station of the system is transmitting an indication to the dispatcher's station, and for likewise locking out all field stations from interfering with the transmission of a control signal from the dispatcher's station.

Still other features have to do with the provision of means for cutting out any station without affecting the remaining stations, and in the provision of circuits and apparatus enabling any field station to become the last station of the system.

The invention is illustrated in eight figures of drawings.

The Figs. 5 to 8, inclusive, when arranged with Fig. 5 immediately above Fig. 6 and with Figs. 7 and 8 placed at the right of Figs. 6 and 5, respectively, diagrammatically illustrate the circuits and apparatus of the dispatcher's station of the system.

The tell-tale relays, the relays of the miscellaneous relay group, and sender and connector relays are of the general type ordinarily employed in automatic telephone systems. The polar relays are of the stay-put type, that is, their armatures always remain in their last operated position.

The sender switches S and SS' are of the well known single motion pawl and ratchet type, arranged to advance their wipers upon each deenergization of their motor magnet.

The mechanisms of the incoming selector switch IS and of the connector seizing switch CS are also of the well known single motion pawl and ratchet type, but differ from the sender switches in that they always advance their wipers upon the energization of their motor magnet, and are provided with release magnets which function, when energized, to permit their wipers to restore under tension of their restoring springs.

The connector switches D and D', employed to select the polar relays, are of the well known Strowger type.

Figure 1:
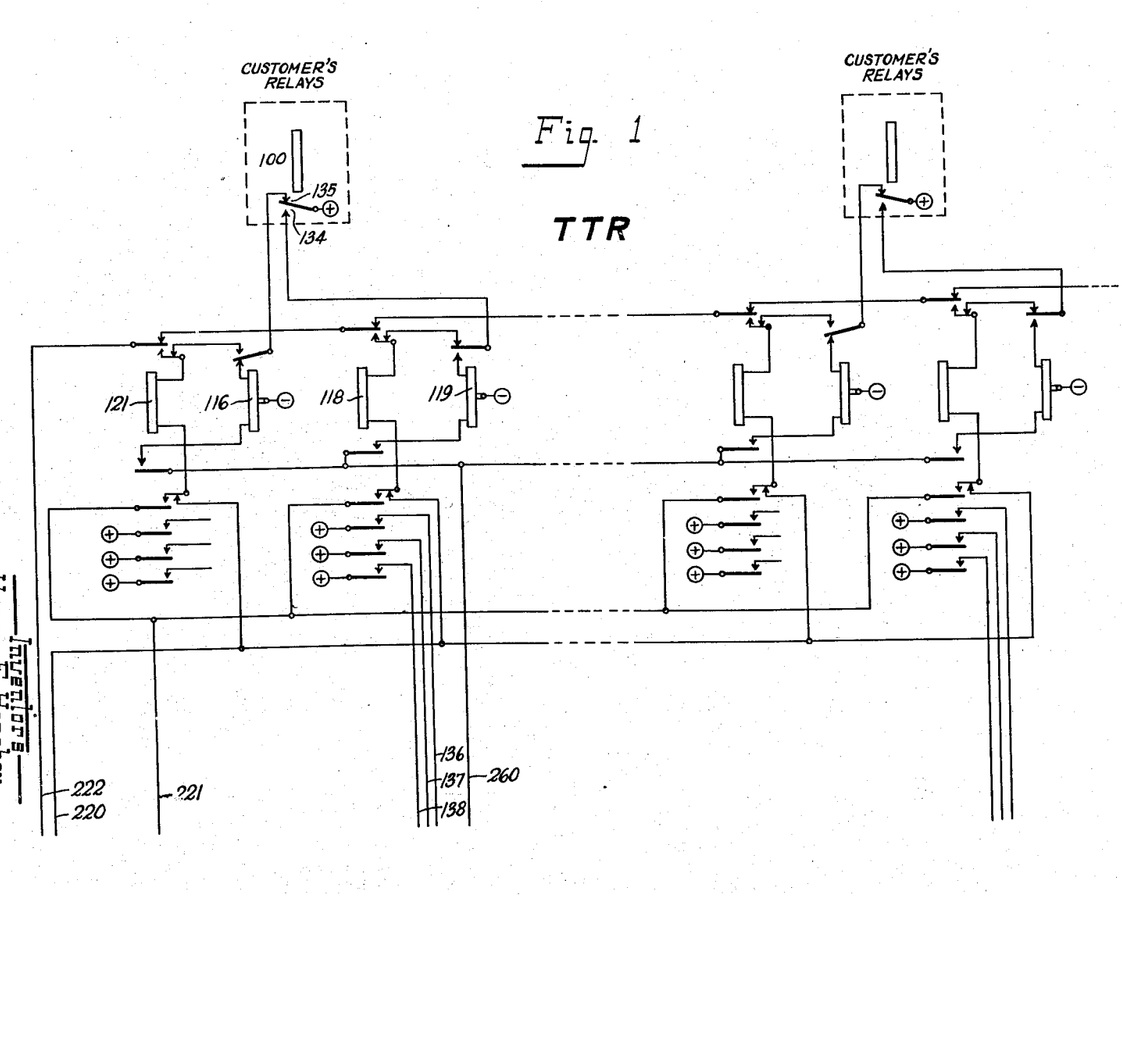
Figs. 1 to 4 inclusive, when arranged with Fig. 1 immediately above Fig. 2 and with Figs. 3 and 4 to the right of Figs. 2 and 1, respectively, diagrammatically illustrate the apparatus and circuits of one field station of the system.
Figure 2:
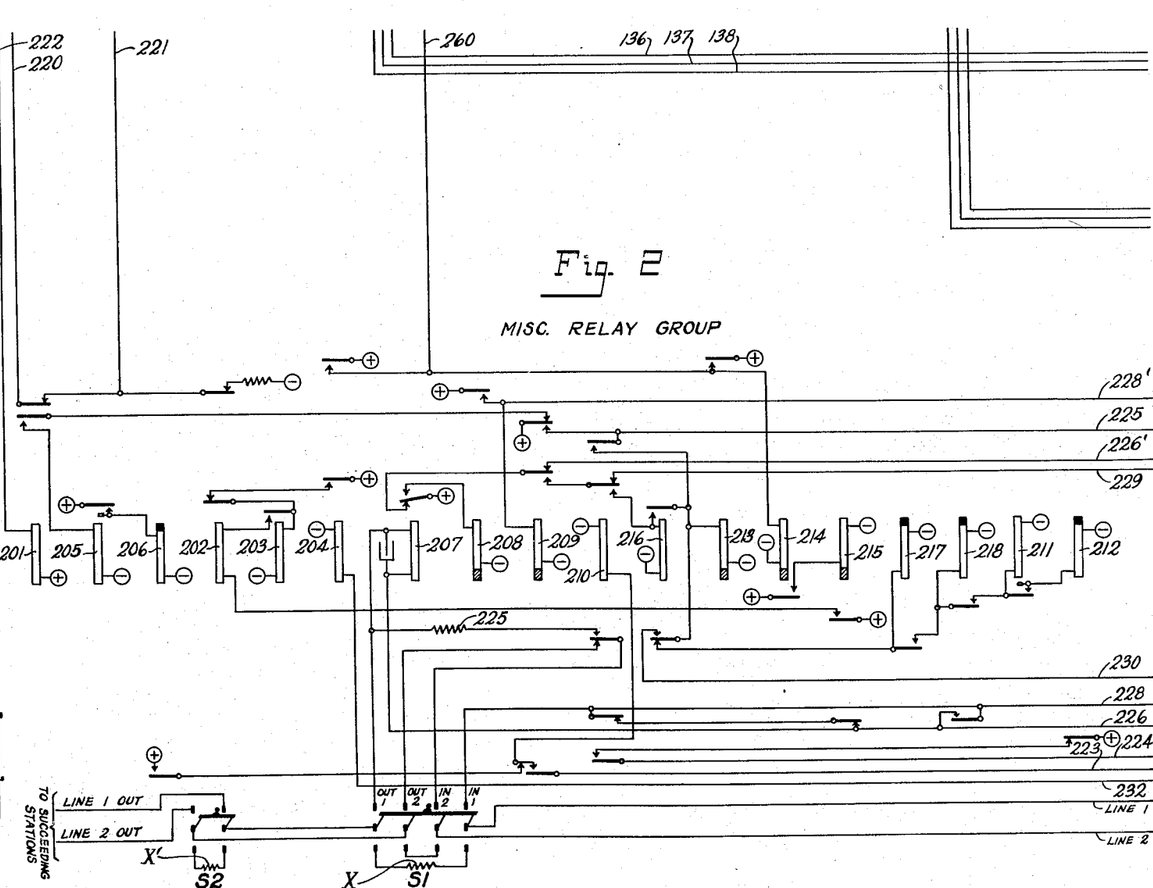
Figure 3:
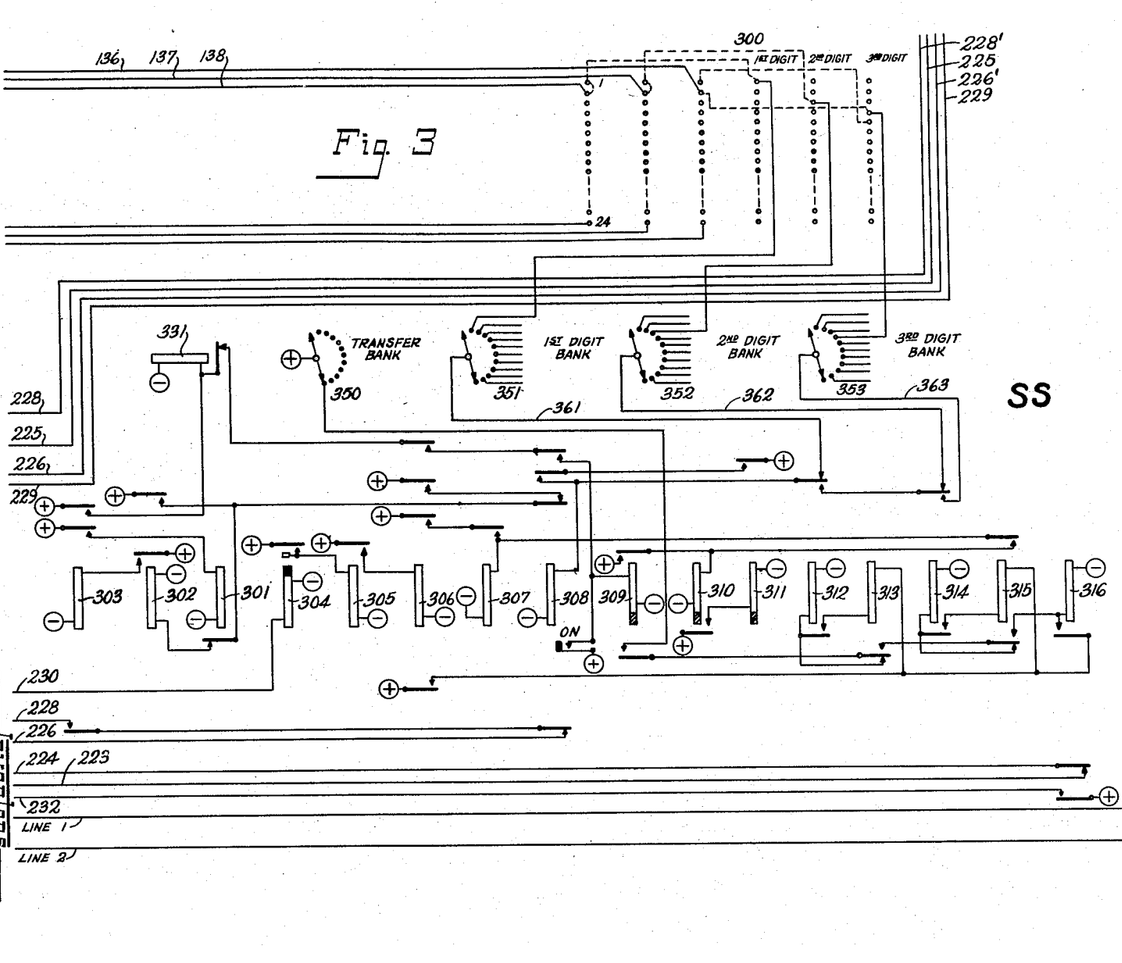
Figure 4:
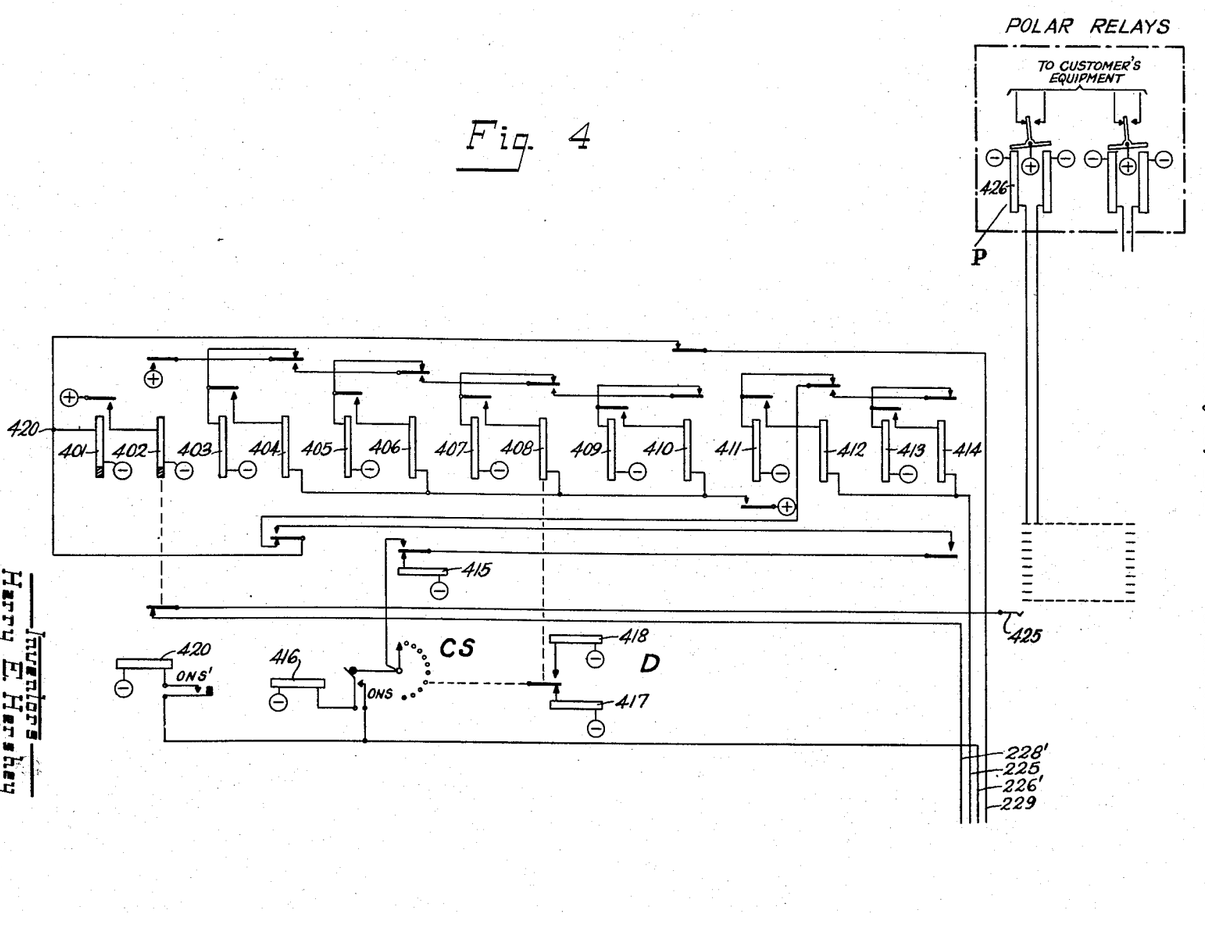

The relay 100 and the other like relays, included in the interrupted dash-line rectangles of Fig. 1 are merely shown to make the disclosure of applicant's invention complete. They have been labeled "Customers' relays" on the assumption of sale of the equipment covered by the present invention to a customer already having these relays and the customer's equipment hereinafter referred to.

It is believed that a most thorough understanding of the invention can be obtained by describing the operation of the system.

Referring now particularly to the field station circuits and apparatus, comprising Figs. 1 to 4, it is assumed that all switches are at normal, and that all of the relays in the field station are in the position shown.

Figure 5:
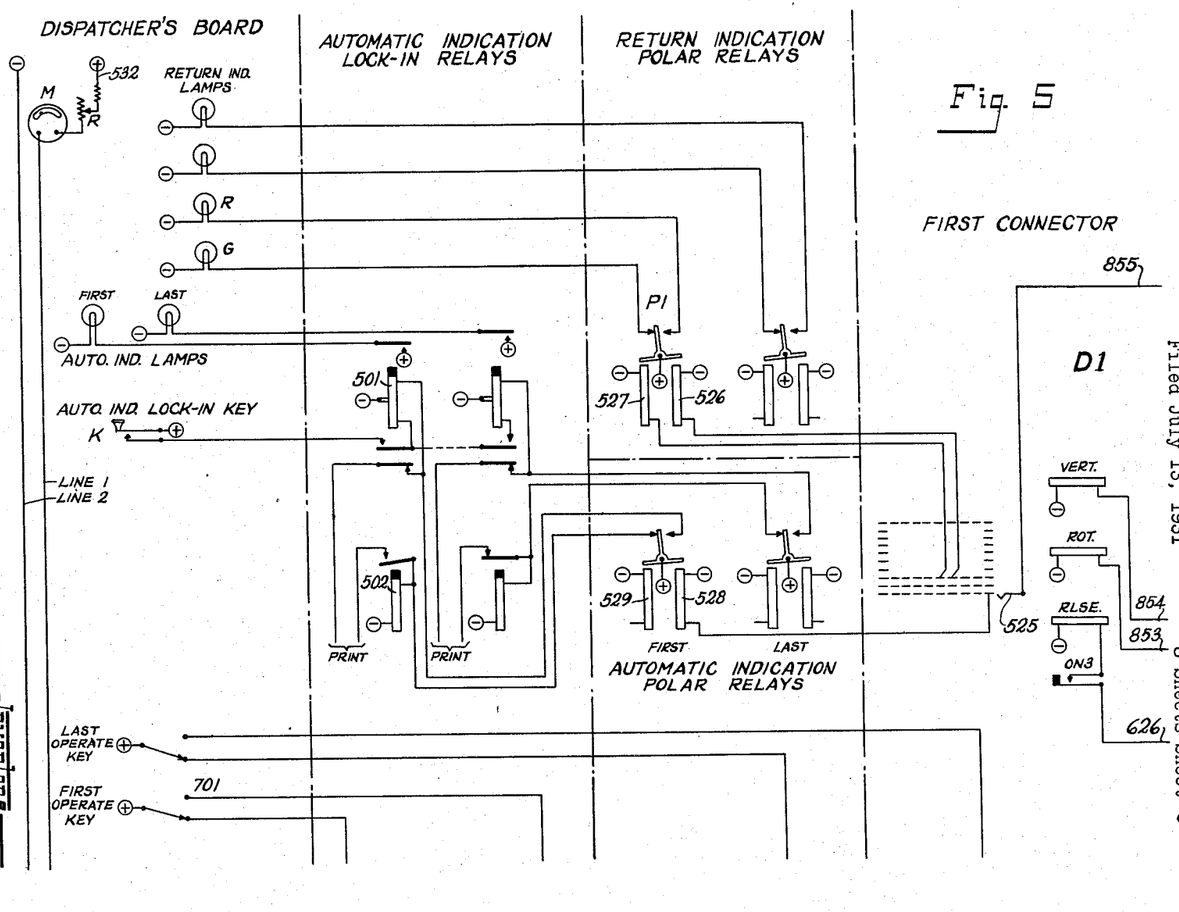
Figure 6:
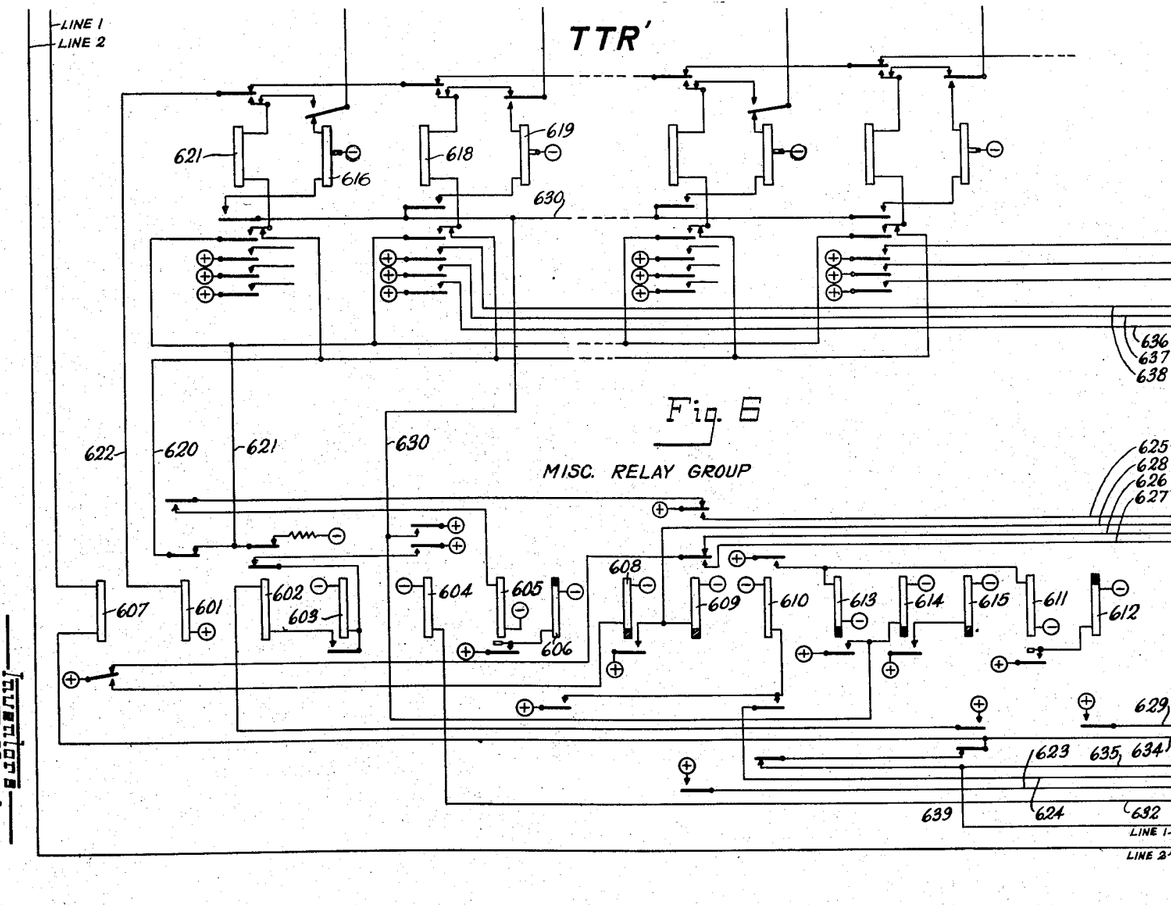
Figure 7:
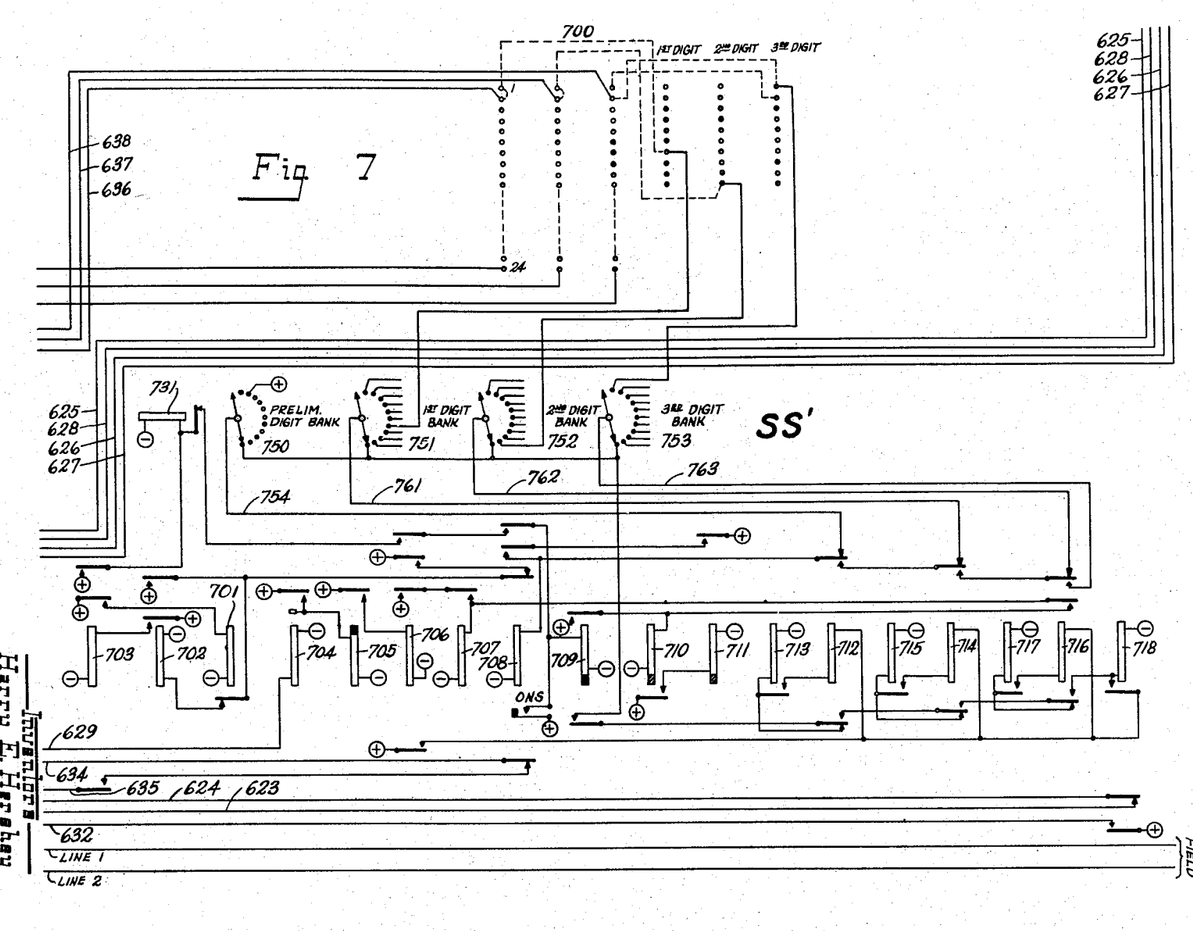
Figure 8:
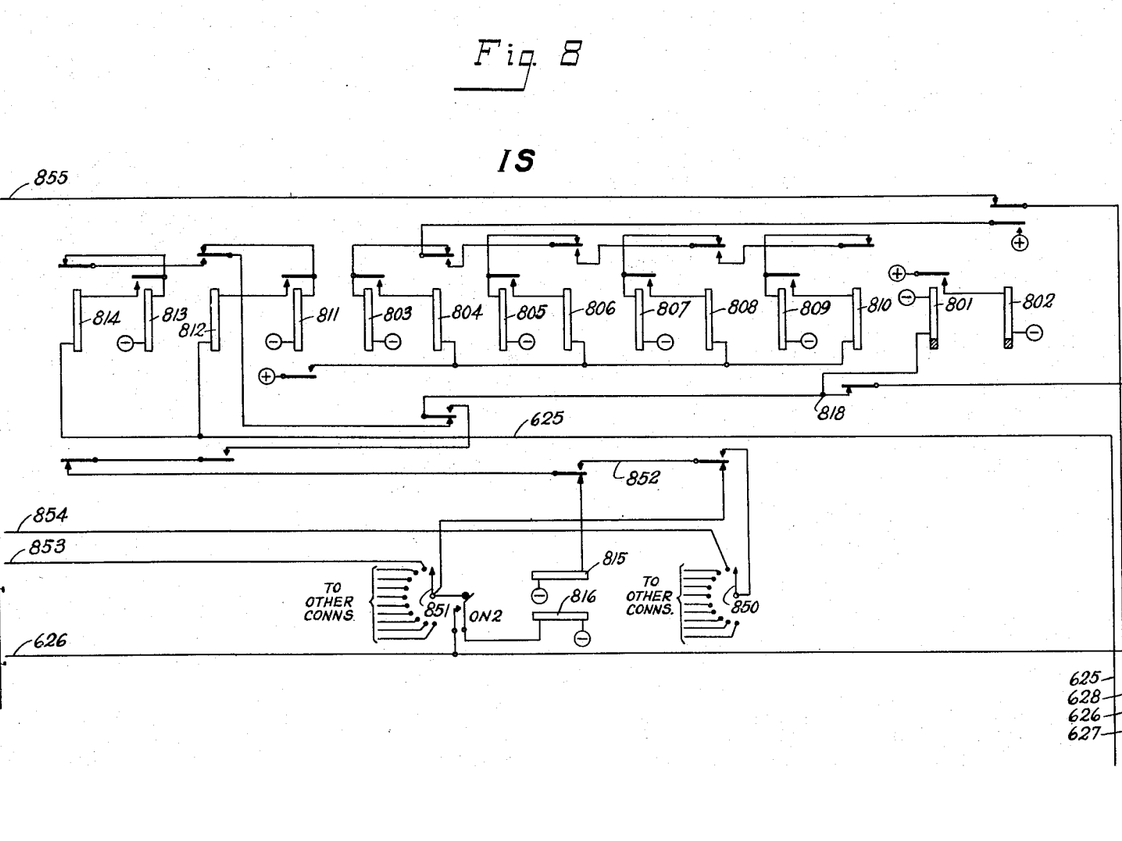

The tell-tale relay 116 is energized and locked by way of the upper contacts of the customer's relay 100, because of a previous operation. The relay 207 of the miscellaneous relay group is energized because it is the line relay for this station and is included in a normally closed line including all stations of the system. This circuit may be traced from the positive side of the line battery at the dispatcher's board, Fig. 5, through the dispatcher's line relay 607, the lower break contacts of relays 615 and 610, respectively, #1 line conductor extending to the field station, through contacts of the station cut-out switch S1, through the winding of the field line relay 207, and out over #1 line, through the line relays of the succeeding field stations, not shown, and back over #2 line, through the station cut-out switch S1, the inner-lower break contacts of relay 210, the switch S1 and the #2 line to negative potential at the dispatcher's station. The polar relays P and P' are magnetically held in the position shown, because that happens to be their last operated position.

Tell-tale relay operation

It will now be assumed that the armature of the customer's relay 100 moves to its lower position.

The relay 116 becomes deenergized, because of the opening of its circuit which, as previously stated included the upper contact of the customer's relay 100. The deenergization of relay 116, is however without effect at this time. The relay 118 becomes energized over the circuit extending from positive potential supplied through the lower contacts of the customer's relay 100, the break contacts of relay 119, the inner-upper break contacts of relay 118, the winding of this relay, its lower break contacts, pick-up conductor 220, and through the break contacts of relay 201, and the upper break contacts of relay 202 to negative potential. The relay 118, upon operating, completes a locking circuit for itself which includes the winding of relay 201, conductor 222, the upper break contacts of relay 121, the upper make contacts of relay 118, its winding, the lower make contacts of this relay, conductor 221, and the upper break contacts of relay 202 to negative potential.

The relay 201, accordingly, operates and at its upper contacts removes negative potential from the tell-tale pick-up conductor 220. The tell-tale relay 118 also, at its three lowermost contact sets connects positive potential to the conductors 136, 137, and 138. These conductors, obviously, extend by way of the cross-connecting frame 300, and by way of appropriate jumpers thereat to the first, third, and fourth bank contacts, respectively, of the first, second, and third-digit banks 351, 352, and 353, thereby marking the codes on the sender so that the same will subsequently transmit the code 134 to the line. Furthermore, the relay 118 at its inner-lower make contacts prepares the reset circuit of relay 119.

*Miscellaneous relay operation*

The relay 201, in addition to breaking the pick-up circuit for the tell-tale relay, at its lower contacts completes the circuit of relay 205 by way of the upper resting contacts of relay 209. The relay 205, upon energizing, vibrates its armature which eventually comes to rest in energized position, and closes the circuit of slow-to-pull relay 206. The slow-acting characteristic of relays 205 and 206 may be adjusted to introduce a delay anywhere from one-tenth second to two seconds. The purpose of this delay is to provide the necessary interval between codes for the release of the connector at the dispatcher's station. In other words, the time between the reenergization of the line relay 207 at the end of a code and its deenergization for the beginning of the next code must be sufficient to allow for the complete release of the distant Strowger switch.

The relay 206, upon energizing, closes a circuit, by way of the lower break contacts of relay 209, to the relay 210. This latter relay, upon operating, at its middle-lower contacts opens the #1 line, at its inner-lower contacts transfers the #2 line "in" from the #2 line "out" to the "out" side of the line relay 207, thereby removing line battery from all stations more distant from the dispatcher's station, at its lowermost contacts prepares its own locking circuit, at its upper-outer make contacts closes a point in the circuits to relays 213 and 217 and in the locking circuit for relay 216, and at its inner-upper contacts opens the operate lead 229 extending to the switches CS and D and closes a point in the operating circuit of relay 216.

The opening of the #1 line causes the deenergization of the line relay 207, which, at its back contacts completes the circuit of slow-release relay 208 which, in turn, completes the circuit of slow-release relay 209. Upon the energization of relay 209 this relay, at its lowermost contacts opens the operating circuit of relay 210 and completes a locking circuit for this relay which includes the conductors 223 and 224 and the break contacts of the relay 316 of the sender switch SS. The relay 209 also, at its upper make contacts completes a circuit by way of the upper-outer make contacts of relay 210 to the relay 213, and by way of the break contacts of relay 216 through the winding of relay 217. The relays 214 and 215 also operate consequent to the operation of relay 213, but without effect at this time. The relay 209 also, at its upper contacts opens the operating circuit of relay 205, which in turn opens the circuit of relay 206, and at its inner-upper contacts disconnects the conductor 220'.

The relay 217, upon energizing, closes the circuit of relay 218 which also operates, and closes a circuit which extends from the #1 line "in", conductor 228, through the lower contacts of relay 218, the line relay 207, compensating resistance 225, the inner-lower contacts of relay 210 to the line #2 "in". The line relay 207, accordingly, energizes, and at its front contacts completes the prepared circuit of relay 216 by way of the inner-upper make contacts of relay 209 and the inner-upper make contacts of relay 210. The relay 216, accordingly, energizes and locks itself up by way of its upper contacts, the upper make contacts of relay 210 and positive potential at the upper make contacts of relay 209. The relay 216 also, at its lower contacts interrupts the circuit of relay 217, which in turn opens the circuit of relay 218. The latter relay releases quickly and again opens the circuit of the line relay 207.

The relays 211 and 212 provide a delay feature which constitutes part of the lockout circuit, and which will be gone into later. Ordinarily the relay 212 does not have time to operate before the relay 218 has again released.

The foregoing operation of relays 217, 218, and 216 have thus resulted in a single pulse, of approximately two-tenth seconds duration, being delivered to all of the line relays 207 of the field stations lying between the active field station and the dispatcher's station. This is termed the preliminary pulse, which has three functions, the first being the completion of the seizure of the line by this station. The second function is the locking out of the connectors of all field stations between this station and the dispatcher's station, so that these latter connectors will not step on the codes transmitted from the field. The third function is the preparation of the dispatcher's connector for receiving a code from the field.

The relay 216, upon energizing as before explained, at its upper contacts completes a locking circuit for itself including the upper contacts of relay 210 and the upper make contacts of relay 209; forestalls the operation of relay 212 by at its lower contacts opening the circuit of relay 217, with the resultant opening of the circuit of relay 218, and extends positive potential through its lower make contacts and conductor 230, to the relay 304 of the sender. The relay 305, accordingly, also energizes.

*Sender operation*

The function of delay relays 304 and 305 of the sender, is to allow a suitable interval, after the preliminary pulse, for the completion of all lockout functions, and for the preparation of the dispatcher's incoming circuit.

Relay 305, upon energizing, completes the circuit of relay 306. This relay, upon energizing, at its middle-upper contacts closes a circuit for the impulsing relay 302 by way of the upper break contacts of relay 308 and the lower break contacts of pulsing relay 301, at its lower contacts prepares the locking circuit of relays 312 to 315, inclusive, at its inner-upper contacts prepares a locking circuit for relay 307, and at its upper-outer contacts prepares the homing circuit for the sender switch SS.

The completion of the aforementioned circuit of pulsing relay 302 causes this latter relay to energize. The relay 302 at its inner-upper contacts completes the circuit of relay 303 and at its upper contacts completes a locking circuit for itself by way of the break contacts of relay 301. The relay 303, upon operating, at its inner-upper contacts completes the circuit of relay 301, which, in turn, opens the circuit of relay 302. The relays 301, 302, and 303, accordingly, interact so long as there is positive potential supplied through the inner-upper contacts of the relay 308. Each time the relay 303 energizes, in addition to closing the circuit of the relay 301, at its lowermost contacts it transmits pulses from negative potential on the #2 "in" line, supplied from the dispatcher's station, through the inner-lower make contacts of relay 210, the compensating resistance 225, line relay 207, conductor 226, through the lower break contacts of relay 308, through the lower make contacts of relay 303, and conductor 228 to the line #1 "in", and through the line relays of any field stations intermediate to the sending field station and the dispatcher's station, and through the line relay 607 of the dispatcher's station by way of the lower break contacts of relay 610 and the lower break contacts of relay 615 to positive potential. These pulses operate the associated line relay of the intermediate stations and of the dispatcher's station, which, in turn, through the medium of their resting contacts maintain their associated slow-release relays, such as 208 and 209, energized because of their slow-to-release characteristic.

The relay 303 at its upper contacts transmits pulses direct to the motor magnet 331 of the sender switch, causing the latter to take one step for each pulse delivered into the #1 line.

At the first step of the sender switch, the off-normal springs ON close, thereby causing the energization of the slow-release relay 309 which, in turn, completes the circuit of relay 310 and it in turn, the circuit of relay 311. The relay 311, upon operating, prepares a primary locking circuit for the relay 308.

When the marked contact is reached, positive potential is applied over the conductor 138 extending from the tell-tale relay 118, through the cross-connecting frame, the first-digit bank 351 and its associated wiper, to the conductor 361, and through the break contacts of relay 312, and the winding of relay 308 to negative potential. The relay 308, upon energizing, at its lowermost contacts opens the pulsing circuit to the #1 line, at its upper break contacts, also opens the circuit extending to the pulsing relay 302, at its middle-upper contacts completes a locking circuit for itself and at its uppermost contacts completes the return-to-normal circuit for the sender, which extends from positive potential at the off-normal contacts ON, through the uppermost contacts of relay 308, the uppermost contacts of relay 306, through the break contacts of the motor magnet 331, and through the winding of this magnet to negative potential. The motor magnet will, therefore, act in a buzzer-like manner to advance the wipers of the sender to their normal positions, at which time the off-normal springs ON open and stop the sender in this position.

The relay 309 also deenergizes consequent to the opening of the off-normal contacts ON. In the interval between the time the wiper of the transfer bank 350 reaches its normal contact and the deenergization of relay 309, a circuit is closed from positive potential on the wiper of bank 350 in its normal position, through the lower make contacts of relay 309, the break contacts of relay 313, and the winding of counting relay 312 to negative potential. The relay 312 at its lower contacts prepares the circuit of relay 313, and at its upper contacts transfers the control circuit of relay 308 from connection with the conductor 361 and the associated first-digit bank 351 by way of the back contacts of relay 314 to the conductor 362 extending to the wiper of the second-digit bank 352.

As soon as the contacts of the relay 309 restore the relay 313 becomes energized in series with the relay 312 over the circuit including the lower contacts of relay 306. Upon the energization of relay 313 this relay transfers the counting circuit from connection with relay 312 to the relay 314 by way of the break contacts of relay 315.

Returning to a consideration of the action of the off-normal springs ON, it will be remembered that the relay 309 deenergized shortly after the sender returned to normal, thereby opening the circuit of the slow-release relay 310, which in turn opens the circuit of slow-release relay 311. The relay 311, upon deenergizing, at its contacts opens the locking circuit of relay 308 which, accordingly, deenergizes and causes the sender to transmit the second digit of the code. At this time the relay 308 is associated with the wiper of the second-digit bank 352, and when the marked contact is reached, positive potential is applied over the conductor 137 extending from the tell-tale relay 118, through the cross-connecting frame, the third-bank contact of bank 352, its associated wiper, the conductor 362, the break contacts of relay 314, the upper working contacts of relay 312, and the winding of code-cut-off relay 308 to negative potential. The relay 308 will, accordingly, again operate as before to cut-off the pulses, and this time three pulses will have been delivered to the #1 line.

The sender switch will now return to normal, in the manner previously described, and when the same reaches normal the relays 314 and 315 will operate, in substantially the same manner as did relays 312 and 313 at the termination of the first code. The relay 314 transfers the circuit of the code cut-off relay 308 from connection with the conductor 362 extending to the wiper of the second-digit bank 352 and connects it with the conductor 363 extending to the wiper of the third-digit bank 353. The relay 315, upon operating, at its upper contacts closes a point in the secondary locking circuit for relays 307 and 310, and at its lower contacts extends the counting circuit into connection with the relay 316.

The sender switch will now function to send the third digit of the code, as soon as the off-normal springs ON have become operated, the relay 309 again becomes energized and at its lower contacts completes the circuit of relay 307 by way of the upper contacts of the relay 315. The relay 307, upon operating, at its contacts completes a locking circuit for itself and prepares the secondary locking circuit of the relay 308, by extending its own locking circuit from the lower contacts of the relay 306 to the relay 310, thus making the relays 310 and 311, as well as the relay 308, independent of relay 309.

Since at this time the relay 308 is associated with the wiper of the third-digit bank 353, when the marked contact is reached, relay 308 will operate as before to cut-off the pulses and this time four such pulses will have been delivered to the #1 line.

The code is now completed, and the sender must not again function following the deenergization of relay 309. For this reason, the relays 310, 311, and 307 have been locked up through the inner-upper contacts of relay 306, as previously described.

At the end of the transmission of the third digit, the relay 316 energizes over the previously traced counting circuit, at its inner-lower make contacts completes a locking circuit for itself including the lowermost contacts of the relay 306, at its lowermost contacts places positive potential upon the reset conductor 232 to the winding of reset relay 204, and at its break contacts opens the circuit of relay 210.

As a resultt of the second function, the relay 204 of the miscellaneous relay group becomes energized. This relay at its lower contacts completes the circuit of relay 203 by way of the lower break contacts of relay 202. The relay 203, accordingly, energizes and closes a point in the circuit of the relay 202. The relay 204 also places positive potential on the reset common conductor 260 of the tell-tale relays. This positive potential passes through the inner-lower closed make contacts of the relay 118 and holds the relay 119 energized independently of the circuit formerly completed for it at the upper contacts of the relay 213.

As a result of the third function of the relay 316, as previously mentioned, the locking circuit of the relay 210 of the miscellaneous relay group is opened. The relay 210, accordingly, at its upperinner contacts opens the circuit of relay 304 of the sender, whereupon this relay and the other relays of the sender return to normal; and at these same contacts opens the locking circuit of relay 216 which, accordingly, deenergizes. The relay 210 also, at its lowermost contacts opens its own locking circuit, at its middle-lower contacts recloses the #1 line, but without effect at this time, as the line is still open at the contacts of relay 215, and at the uppermost contacts opens the circuit of relay 213, and at its inner-lower contacts opens the by-path of the #2 line conductor and re-establishes this conductor to its normal condition.

The relay 213, upon deenergizing, opens the circuit of relay 214 and it, in turn, the circuit of relay 215. The relay 215 deenergizes after a slight delay, at its upper contacts opens the circuit of relay 202, and at its lower contacts closes the #1 line, whereupon the line relay 207 will energize and open the circuit to the associated slow-release relay 208, which in turn, opens the circuit of slow-release relay 209. The station has thus released the line, which may now be seized by some other field station.

The slow-release relays 213, 214, and 215 afford the necessary delay required between the last digit of the code and the re-energization of the line relays for the last relay counting operation, in the dispatcher's incoming selector.

Returning to a consideration of the release of the sender, mentioned heretofore as the first function of the release of relay 210, the release of relay 304 of the sender causes the release of relay 305, which, in turn, opens the circuit of relay 306. This latter relay, at its middle-upper contacts, opens the circuit extending to the relay 302 of the pulsing relay group, at its uppermost contacts opens the homing circuit of the sender switch, at its lowermost contacts opens the locking circuit for, and causes the release of, the relays 307, and 312 to 316, inclusive, as well as of the relay 310 which, in turn, opens the circuit of relay 311. This latter relay, upon deenergizing, opens the locking circuit of relay 308.

Second tell-tale relay operation

If, previous to the completion of the operations just described, a second customer's relay has become operated, its associated tell-tale relay will energize upon the release of the tell-tale relay 118, and miscellaneous relay 201, whereupon the miscellaneous relays will again attempt to seize the line, and if successful will start the sender to send the code marked by the newly energized tell-tale relay.

Field connector lockout

When the field station is sending, its connector is out of control of the pulse circuit, due to its operate conductor 229 being opened at the innerupper break contacts of its associated relay 210, as previously mentioned. On this account, neither the preliminary pulsing nor the code pulses have any effect on the connector. When a station beyond this station is sending, the line relay 207, in response to the preliminary pulse, opens the circuit by way of the inner-upper make contacts of relay 209 and the inner-upper break contacts of relay 210 to the operate conductor 229, and from thence by way of the break contacts of the relay 410, to point 420 where the circuit divides, one branch passing through the winding of the relay 401 to negative potential and the other branch extending by way of the lower-break contacts of relay 404, the break contacts of relay 412 to the winding of relay 411 and negative potential. The relay 401, upon operating, completes the circuit of relay 402, which in turn at its upper contacts completes the circuit of relay 403 by way of the upper break contacts of relay 404. Upon the cessation of the preliminary pulse, the relay 412 becomes energized in series with the relay 411, these relays now being locked up by positive potential supplied to the hold conductor 225 at the upper-make contacts of relay 209. After a slight interval following the termination of the preliminary pulse, the slow-release relays 401 and 402 become deenergized. The relay 402, upon deenergizing, at its upper contacts removes positive potential from the upper winding of relay 403 and from the winding of relay 404, the relay 404, accordingly, becomes energized in series with the relay 403 from positive potential supplied through the lower contacts of the relay 411. The relay 404, upon operating, at its lower contacts opens the operating circuit leading to the relays 411 and 413 and extends this operating circuit to the inner-lower contacts of the relay 414. This relay, however, has failed to energize, and continues to hold open the operate circuit to the magnet 415. It will thus be evident that the subsequent series of code pulses will be ineffective to operate the connector of the intermediate field station, and are effective only at the dispatcher's incoming selector.

To the field operation

To explain this operation it is assumed that all switches are at normal, and that all relays are in the positions shown. When the dispatcher seizes the line, all of the line relays such as 207 of the miscellaneous relay group, will deenergize and close the circuit of relay 208. This relay in turn closes the circuit of the relay 209 and to the conductor 228' extending to the wiper of the field connector by way of the break contacts of the relay 402 thereof. The relay 209, upon operating, at its lower break contacts opens the circuit of relay 210, at its upper make contacts places positive potential on the hold conductor 225 extending to the field connector, and at its inner-upper contacts opens a point in the connector release circuit, and closes a point in the operate circuit of the field connector.

When the dispatcher moves the first operate key to its upper position, the code 701 is sent out. As will be explained, the preliminary digit 2, first precedes all codes to the field. The line relay 207, accordingly, responds to the preliminary digit 2, but the slow-to-release relays 208 and 209, which pulled up upon the deenergization of the relay 207, will not fall away during the momentary interruption in the circuit to relay 207. Therefore, at each operation of the line relay 207 a circuit is closed by way of the inner-upper make contacts of relay 209, the inner-upper break contacts of relay 210, the operate conductor 229, upper break contacts of relay 410, and the relay 401 to negative potential. The relay 401 energizes upon the first pulse and will remain energized until shortly after the end of the second pulse. The relay 401 in turn completes a circuit for relay 402 and it, in turn, completes the circuit of relay 403 by way of the upper break contacts of relay 404. The relay 403, upon energizing, prepares the circuit of relay 404. The first pulse to relay 401, also extends by way of the lower break contacts of relay 404 and the break contacts of relay 412 to the winding of relay 411 and negative potential. The relay 411, accordingly, also energizes and at its upper contacts prepares an operating circuit for relay 412, while at its lower contacts it applies holding potential to the common holding circuit for the relays 404 to 410, inclusive. Upon the cessation of the first pulse, relay 412 energizes in series with the relay 411 over a circuit including the hold conductor 225 and positive potential supplied thereto at the upper make contacts of relay 209. The relay 412, upon operating, transfers the counting circuit from connection with relay 411 into connection with the relay 413, so that upon the transmission of the second pulse of the preliminary digit it causes the energization of the relay 413. Upon the cessation of the second pulse the relay 414 becomes energized in series with the relay 413 and at its upper contacts opens the counting circuit, while at its lower contacts it extends the operating circuit into connection with the magnet 415 of the connector-seizing switch CS.

The slow-release relay 401, which has remained energized during the transmission of the two impulses comprising the preliminary digit, now deenergizes causing the deenergization of its associated slow-release relay 402. Upon the release of the relay 402, the relay 404 energizes in series with the relay 403 and at its upper contacts opens the initial energizing circuit of relay 403 and prepares the energizing circuit of relay 405, while at its lower contacts it opens a point in the operate circuit of relay 411 and completes the extension of the operating circuit by way of the lower make contacts of relay 414 and the lower break contacts of relay 406 to the magnet 415 of the connector-seizing switch CS.

The line relay 207 of the miscellaneous relay group will next respond to the seven impulses comprising the first digit of the code 701. The connector relays 401 and 402 will energize as before on the preliminary digit, and the relay 402 at its upper contact closes the circuit to the relay 405 by way of the upper make contacts of relay 404 and the upper break contacts of relay 406. At each operation of the line relay, a circuit is also closed by way of the lower make contacts of relay 404, the make contacts of relay 414, and through the lower break contacts of relay 406 to the winding of magnet 415 of the connector-seizing switch to negative potential.

As a result of the foregoing the connector-seizing switch advances its wiper to the seventh bank contact of its bank. At the end of the series of seven pulses, relays 401 and 402 again deenergize, whereby the relay 405 locks up to the hold conductor in series with the relay 406, which energizes over this circuit. This relay at its upper contacts transfers the counting circuit from connection with relay 405 into connection with relay 407, and at its lower contacts disconnects the operating circuit from connection with the magnet 415 and extends this circuit by way of the wiper of the switch CS and the lower break contacts of the relay 408 to the vertical magnet 417 of the connector D.

The next series of impulses will accordingly pass through the vertical magnet 417 of the connector switch. The relays 401 and 402 function as before to cause the operation at this time of counting relays 407 and the subsequent operation of relay 408 following the transmission of the second digit of the code. The relay 408, upon operating, at its lower contacts transfers the operating circuit from connection with the vertical magnet 417 into connection with the rotary magnet 418 of the seized connector, and at its upper contacts transfers the counting circuit to the relay 409.

The last series of impulses, this time comprising the digit 1, will accordingly pass through the rotary magnet 418 of the connector. During the transmission of the last digit, relays 401 and 402 again function as before and the extended counting circuit causes the operation of the relay 409, followed by the operation of relay 410 following the release of relay 402. The relay 410, upon operating, at its upper contacts opens the operating circuit to relay 401 and to the magnet 418, and at its lower contacts also opens the counting circuit.

As a result of the foregoing operations, the wiper 425 of the connector has been raised ten steps and rotated in one step and is now in engagement with the bank contact with which is associated the coil 426 of the first polar relay.

When the connector relay 402 becomes deenergized, following the transmission of pulses to the rotary magnet 418 of the connector, the winding 426 of the first polar relay will be energized by positive potential supplied over the contacts of relay 208, wiper conductor 228', the break contacts of relay 402, wiper 425, the O1 contact of the connector bank, and the winding 426 of the first polar relay to negative potential. The polar relay P will now move its armature over to the right to close certain circuits to the customer's relay while opening others.

The code to the field is now complete, and the dispatcher's equipment will now maintain the line closed, thereby again energizing all of the line relays in the system, whereupon all miscellaneous relays 208 and 209 and 608 and 609 will deenergize. The relay 209, upon deenergizing, completes the release circuit of its connector-seizing switch CS and of the associated connector, if the same has been operated. This circuit extends from positive potential supplied through the make contacts of the line relay 207, the inner-upper break contacts of slow-release relay 209, release conductor 226' and through the off-normal springs ONS and ONS' of the switch CS and of the connector, such as D, to the release magnets 416 and 420 of these switches to negative potential. Previous to the release of relays 208 and 209 the line relay 207 again places positive potential by way of the lower make contacts of relay 209 to the operate conductor 229, but this operation is without effect owing to the fact that the operate circuit is at this time open at the upper contacts of relay 410 of the connector.

The switch CS and the connector now return to normal, their release magnet circuits being opened at their off-normal contacts on the completion of the release operation. The relay 209 also, upon restoring its upper contacts removes positive potential from the hold conductor 225, whereupon all of the counting relays of the field connector are restored. The switch CS at each field station has responded to the first digit, but the second and third digits will have been ineffective, except for such connectors whose pulsing circuits are led through the seventh contacts of their switches CS, and only one of these will find a polar relay coil connected to the bank contact O1.

It should also be noted that the wiper of the connector switch is open during the time that the first field wiper 425 is passing over contacts of a bank, because of the break contacts of relay 402, and is open during the release operation because of the deenergized condition of the relay 208.

Field lockout

If the dispatcher is using the line, the field is locked out because of the energized condition of miscellaneous relays 208 and 209 at all field stations. This is the case because, with the relay 209 energized, positive potential is removed from the lead extending through the break contacts of the relay 201 to the winding of relay 205. Therefore, no field station can seize, even though the miscellaneous relay 201 may be energized.

When a field station is using the line, all other field stations are locked out because of the same reason given above, i. e. they cannot establish a circuit for their relay 205, while the associated relays 208 and 209 are energized.

Simultaneous field operation

Two field stations may function at so nearly the same time that their miscellaneous relays 210 become energized simultaneously. The station nearest to the dispatcher will function normally to seize the line, it being remembered that the relay 210 opens the line to all stations beyond it at its inner-lower break contacts. The station beyond will lockout as follows:

The line relay 207 will deenergize, and cause the deenergization of its associated relays 208 and 209. The relay 218 will attempt to send the preliminary pulse to the line relay in the usual manner, but its contacts will close without effect, since the line is already open at the near field station, and relay 207 will not energize. Relay 218 will remain energized, to maintain the circuit to relay 211 closed. In due time, therefore, the slow-to-pull relay 212 will operate, and open the locking circuit of relay 210.

Relay 210 will now fall away, and at its upper contacts opens the circuit of relays 213, 217, 218, 211, and 212, respectively, and these relays also deenergize. The relays 205 and 206 have been previously deenergized upon the energization of relay 209, the station beyond is now locked out and all relays are again in their normal position, with the exception of the tell-tale relay and relay 201 of the miscellaneous relay group, together with the line relay 207 and its associated slow-release relays 208 and 209.

When the line is again freed, the energization of the line relay and the subsequent release of the associated relays 208 and 209 will again cause relays 205, 206, and 210 to test the line. If they are successful in causing the energization of relay 216 their task is done, and all other stations are now locked out until the now active field station has completed the transmission of the initiated code.

Each field station is provided with a station cut-out switch S1 which may be operated to cut that station out of the line without interfering with the other stations of the system. With a station cut-out, resistance X compensates for the resistance of the cut-out line relay 207.

Each station is also provided with a last station switch S2 which may be operated to cut out all stations more distant from the dispatcher's station. The resistance X' of this switch compensates for the total resistance of the line relays of the field station cut off the line.

Referring now to Figs. 5 to 8, inclusive, the detailed circuit operations of the dispatcher's station will be gone into. It is assumed that all of the switches and relays are in their normal position, as shown. Tell-tale relay 616 is energized because the lever spring of the first operate key is in its lower position. The miscellaneous relay 607 is energized because it is the line relay. The first polar relay P1 of the return indication polar relays has its armature magnetically held to the left because that happens to be its last operated position.

It will now be assumed that the dispatcher moves the lever of the first operate key to its upper position.

Tell-tale relay operation

Relay 616 of the tell-tale relay group TTR' will deenergize, but without effect at this time. Relay 618 will energize over a circuit extending from negative potential supplied through the upper contacts of relay 602, through the upper break contacts of relay 601, the pick-up conductor 620, through the lower break contacts of relay 618, the winding of relay 618, its inner break contacts, and through the break contacts of relay 619 to positive potential supplied through the upper contact and first operate key. The relay 618, upon energizing, completes a locking circuit for itself extending from negative potential supplied through the upper contacts of relay 602, the inner common lock-up conductor 621, the lower make contacts of relay 618, the winding of this relay, its upper make contacts, through the upper break contacts of relay 621, and the conductor 622 and winding of relay 601 to positive potential. The locking up of relay 618 over the circuit just traced renders this relay independent of the first operate key, thus insuring that its code will be sent, even if the position of the first operate key is again changed immediately. The relay 618 also, at its inner-lower contacts prepares the reset circuit for tell-tale relay 619, and at its three lowermost sets of contacts applies marking potential to the conductors 636, 637, and 638 extending to the cross-connecting frame 700 and then to bank contacts of the code sender.

Miscellaneous relay operation

Relay 601 energizes over the traced locking circuit of tell-tale relay 618 and, at its inner-upper contacts, opens the pick-up circuit for all telltale relays corresponding to the relay 618, so that no other such tell-tale relay can be operated until after a previously operated one has been restored. Relay 601 also, at its upper contacts completes the circuit of relay 605 by way of the upper break contacts of relay 609. The relay 605, upon operating, completes the circuit of relay 606, which after an interval, in turn closes the circuit of relay 610.

Relays 605 and 606 here again provide a delay feature to give the necessary interval between codes to insure the proper release of the field switches CS and D. This function is necessary only in case a number of codes are being sent in rapid sequence, as when the dispatcher operates several keys at once, or in rapid succession.

Relay 610, upon energizing, at its lower-outer contacts opens the line, at its inner-lower contacts prepares a locking circuit for itself, and at its upper contacts completes the circuit of relays 611 and 613. Relay 613, upon operating, closes the circuit of relay 614 which, in turn, closes the circuit of relay 615. These relays, accordingly, operate but their operation is without effect at this time.

Consequent to the opening of the line, line relay 607 becomes deenergized and at its armature and back contact completes the circuit of slow-release relay 608 which, in turn, completes the circuit of relay 609. The relay 609, upon operating, at its lower most contacts completes the locking circuit of relay 610. This circuit, includes only conductor 623, the break contacts of sender relay 718 and the conductor 624, and is, therefore, independent of the contacts of relay 606. Relay 609, also, at its upper-break contacts interrupts the circuit of relay 605, which deenergizes and interrupts the circuit of relay 606, which also deenergizes, at its upper make contact places positive potential upon the hold conductor 625 extending to the incoming selector IS, and at its inner-upper break contacts opens a point in the circuit extending to the release conductor 626 and at these make contacts prepares a circuit to the operate conductor 627.

Returning to the consideration of the relay 611, which had its circuit closed by the energization of relay 610. The relay 611 after a delay, owing to its slow-to-pull characteristic, causes the energization of relay 612. Relay 612 in turn closes a circuit over the sender start lead 629 to the relay 704 of the sender. The relays 611 and 612 constitute a delay feature having the purpose of giving the dispatcher preference in case of the simultaneous seizure of the line by the dispatcher and field. This will be gone into more thoroughly in discussing the "Dispatcher's lockout".

Sender operation

Relay 704 of the sender now energizes and, after a delay, causes the energization of relay 705. These delay relays 704 and 705 serve to further lengthen the time interval between the opening of the line and the starting of the pulsing, mentioned in the last paragraph. Relay 705, upon operating, closes the circuit of relay 706 which accordingly energizes. This relay at its middle-upper contacts closes a circuit by way of the inner-upper contacts of relay 708 and the contacts of relay 701 to the relay 702 of the pulsing relays, at its outer-upper contacts prepares the return to normal circuit of the sender switch SS', at its inner-lower contacts prepares the locking circuit for relay 707, and at its lower contacts prepares an operating and locking circuit for relays 712, 714, and 716 and a locking circuit for relay 713, 715, 717, and 718.

The relay 702, upon operating, at its lower contacts completes the circuit of relay 703, and at its upper contacts completes a locking circuit for itself through the contacts of relay 701. The relay 703, upon operating, at its inner-upper contacts completes the circuit of relay 701 which, upon operating, interrupts the circuit of relay 702 which, in turn, deenergizes and opens the circuits of relay 703. This action of these relays continues until subsequently cut-off. Relay 703, accordingly, at its upper contacts sends impulses direct to the motor magnet 731 of the sender switch, causing the latter to take one step for each pulse delivered to the line at the lowermost contacts of this relay. The pulses, which are transmitted over the line, extend from positive potential on conductor 532, through the rheostat R milliameter M, #1 line, through the line relay 607, conductor 634, through the lowermost contacts of relay 708, the lower contacts of pulsing relay 703, conductor 635, and over the #1 line conductor out through the line relay of each field station, back over line conductor 2 to negative potential at the dispatcher's station. These pulses will operate the line relay 607 of the miscellaneous relay group, but the slow-release relays 608 and 609 will remain energized during the momentary breaking of their circuits by the line relay. These pluses will also in a similar manner effect the line relay 207 and the associated relays 208 and 209 of the miscellaneous relay groups of all field stations.

At the first step of the sender switch SS', the off-normal springs ONS thereof will close and cause the operation of relays 709, 710, and 711. When the wiper of the preliminary digit bank 750 reaches its second bank contact, a circuit is closed from positive potential, through the bank contact and wiper of the bank 750, conductor 754, the upper break contacts of relay 712, and the winding of relay 708 to negative potential. Relay 708 thereupon energizes and, at its lowermost contacts opens the traced pulsing circuit for the line relay 607, at its inner-upper contacts interrupts the circuit extending to the pulsing relay 702, at its middle-upper make contacts completes a locking circuit for itself including the make contacts of relay 711, and at its uppermost contacts completes the return-to-normal circuit of the sender. This circuit extends from positive potential supplied through the off-normal springs ONS through the uppermost contacts of relays 708 and 706, respectively, and through the interrupter contacts of the motor magnet 731 and the winding of this magnet to negative potential.

The motor magnet will now act as a buzzer and return the sender switch to its normal position, at which time the off-normal springs ONS will open the circuit to the motor magnet and to the slow-to-release relay 709. Consequent to the deenergization of relay 709, relay 710, and in turn relay 711 becomes deenergized. Relay 711, upon deenergizing, opens the locking circuit of relay 708 permitting it to restore. The slow-to-release relays 709, 710, and 711, afford the necessary time interval between digits which is necessary to allow the relays 401 and 402 of all field connectors to release and transfer the pulsing circuit.

When the preliminary digit wiper of the bank 750 reaches its normal contacts, it closes a circuit to the counting relay 713 as follows: from positive potential supplied through the contacts of relay 711, the middle-upper make springs of relay 708, the upper break springs of relay 712, conductor 754, the wiper and normal bank contact 750, through the lower make contacts of relay 709 (relay 709 being slow-to-release has not yet released its armature), the lower break contacts of relay 712, and the winding of relay 713 to negative potential. This circuit is opened an instant later when the relay 709 deenergizes, whereupon the relay 712 energizes in series with relay 713, and locks to positive potential supplied through the lowermost contacts of relay 706. The relay 712, upon energizing, at its uppermost contacts transfers the code-stop circuit from the conductor 754 extending to the wiper of bank 750 to the wiper of the first digit bank 751 by way of the upper break contacts of relay 714 and conductor 761, and at its lower contacts opens the initial operating circuit of relay 713 and prepares the operating circuit of relay 715.

The foregoing operation has resulted in the sending of two pulses out over the line and through all of the line relays. This is termed the preliminary digit, which has two functions, the first being to lockout the stepping circuit of the dispatcher's incoming selector, and the second being to prepare the stepping circuit of the field connector. The second function has already been discussed in the preceding description of the field station circuit under the heading "To the field operation".

As to the first function, when the dispatcher's line relay 607 energizes in response to the first pulse of the preliminary digit, it closes a circuit to the relays 801 and 811 of the incoming selector IS. This circuit extends from positive potential supplied through the front contacts of the line relay 607, the inner-upper make contacts of slow-release relay 609, the operate conductor 627, through the lower break contacts of relay 810, to dividing point 818, from whence one branch extends through the relay 801 to negative potential, while the other branch extends by way of the lower break contacts of relay 804 and the upper break contacts of relay 812 to the winding of relay 811 and negative potential. Relay 801 energizes on the first pulse, and remains operated during the succeeding pulses due to its slow-release characteristic. This relay, closes the circuit of relay 802 which, in turn, causes the energization of the counting relay 803. The counting relay 811 also energizes on the first pulse to prepare the locking circuit for the counting relays 803 to 810, inclusive, and at its upper contacts prepares the circuit of the relay 812. Upon the termination of the pulse, relay 812 pulls up and locks in series with relay 811 to the hold conductor 625, and transfers the counting circuit from connection with relay 811 to relay 813. Upon the receipt of the second pulse relay 813 operates by way of the break springs of relay 814 and the make contacts of relay 812. At the termination of the pulse, relay 814 energizes in series with relay 813 and locks in turn to the hold conductor 625. Relay 814, upon operating, at its upper contacts opens the initial energizing circuit of relay 813, and at its lower contacts opens the operate circuit extending to the motor magnet 815 of the incoming selector. At the termination of the second pulse, relay 801, after a slight delay, deenergizes and opens the circuit of relay 802. Upon the release of relay 802 the relay 804 becomes energized in series with the relay 803. The relay 804, upon operating, at its lowermost break contacts, opens a further point in the energizing circuit of relay 813.

Returning now to the sender, when the relay 708 releases, as before explained, on the deenergization of relay 711, the pulsing relays 701, 702, and 703 and the sender switch again begin to function, to send the first digit of the code, which in this instance is 7.

When the wiper of the first digit bank 751 reaches the seventh bank contact, a circuit is again closed through relay 708 as follows: from positive potential at the lowermost contacts of telltale relay 618, conductor 636, and by way of cross connections on the cross-connecting frame 700 to the seventh contact of bank 751, its associated wiper, conductor 761, the upper break contacts of relay 714, the upper make contacts of relay 712, and the winding of relay 708 to negative potential. Relay 708, therefore, functions as before to open the pulsing circuit and to restore the sender switch SS' to normal position. When the sender switch reaches its normal position, the counting circuit is again closed from positive potential at the make contacts of relay 711, through the upper-middle pair of make contacts of relay 708, the upper make contacts of relay 712, the upper-break contacts of relay 714, conductor 761, the wiper and normal bank contacts of bank 751, the lower contacts of relay 709, the lower make contacts of relay 712, the lower break contacts of relay 714, and the winding of relay 715 to negative potential. The relay 715 thereupon energizes, and upon the release of relay 709, due to the opening of the off-normal springs ONS, counting relay 714 energizes in series with relay 715 to positive potential supplied to it through the lower contacts of relay 706. Relay 714, upon energizing, at its upper contacts transfers the marking circuit from the conductor 761 associated with bank 751 to conductor 762 extending to the wiper associated with the second-digit bank 752. The relay 708 now energizes over the circuit extending from it through the upper make contacts of relay 712, the upper make contacts of relay 714, the upper break contacts of relay 716, the conductor 762, through the wiper and the tenth contact of bank 752 when the wiper reaches this contact. This bank contact having had positive potential put on it by the tell-tale relay 618. The sender now returns to normal in the manner hereinbefore described. When the sender reaches its normal position, the counting circuit will cause the operation of relay 717, from the positive potential supplied through the contacts of relay 711 by way of the upper-make contacts of relay 712 and 714, the upper break contacts of relay 716, conductor 762, the wiper and normal contact of bank 752, the lower make contacts of relay 709, and the lower make contacts of relays 712 and 714, respectively, through the winding of relay 717 and negative potential. The relay 716 energizes in series with the relay 717 in the same manner as did relays 712 and 714, following the deenergization of slow-release relay 709. The relay 716, upon operating, at its uppermost contacts transfers the marking circuit from the conductor 762 extending to the wiper of bank 752 to the conductor 763 extending to the wiper of the third-digit bank 753, at its lowermost make contacts extends the counting circuit to the relay 718 and at its inner-upper contacts prepares a circuit for the relay 707. Relay 711 now releases and unlocks the relay 708.

Consequent to the closing of the inner-upper contacts of relay 708, the sender begins sending the third digit of the code. As soon as the off-normal springs ONS close, relay 709 energizes in the usual manner and closes a circuit from positive potential at its upper contacts by way of the upper-inner contacts of relay 716 to the winding of relay 707 and negative potential. Relay 707, upon energizing, locks itself up through the inner-upper contacts of relay 706. This same locking circuit is also extended to relay 710, which is now energized, so that the locking circuit of relay 708 is dependent upon the release of relay 706, since relays 710 and 711 are at this time locked through contacts of relay 706.

The marked contact will now be found as the first contact in the third-digit bank 753. The relay 708 will, accordingly, energize by positive potential extended by way of the first contact in the third-digit bank 753 and its associated wiper, conductor 763, the upper make contacts of relay 716, and through the upper make contacts of relays 714 and 712, respectively, to the winding of relay 708 and negative potential. When the sender returns to normal, consequent to the closing of the upper contacts of relay 708, the counting circuit, from positive potential on the contacts of relay 711, now extends by way of the wiper and the normal contact of the third-digit bank 753 and through the lower make contacts of relay 709, 712, 714, and 716 to the relay 718. The relay 718 energizes and at its upper contacts completes a locking circuit for itself extending through the lowermost contacts of relay 706. The code is now complete, and the code 701 has been sent to the field, by the sender.

The relay 718, upon energizing, at its lower break contacts effects the "break at the end of the cycle", the effect of which will be described subsequently, and at its lowermost contacts closes the circuit of reset relay 604. This relay, upon operating, at its lower pair of contacts closes the circuit of relay 603, which in turn energizes to prepare the circuit of relay 602, and at its upper pair of contacts closes a circuit for relay 614 which is independent of the contacts of relay 613 and places positive potential on the reset common conductor 630 extending to the tell-tale relay group TTR'. The positive potential from the upper contacts of relay 604 passes by way of the inner-lower contacts of relay 618 to the lower winding of relay 619 and negative potential. The relay 619 will, therefore, energize and lock-up to the upper contact of the first operate key, and will open the operating circuit of the tell-tale relay 618 at its upper contact. This operation will, however, be without effect at this time.

The previously mentioned "break at the end of the cycle", which was effected by the energization of relay 718 opens the locking circuit of relay 610 of the miscellaneous relay group. Relay 610, upon deenergizing, at its lowermost contacts closes a point in the line circuit, at its inner-lower contacts opens its own locking circuit, and at its uppermost contacts opens the circuits of relays 611 and 613. As a result of the latter function, relay 613 releases, but without effect, since the relay 614 is being maintained energized over the previously-mentioned circuit including the upper contacts of relay 604. The relay 611, upon deenergizing, however, opens the circuit of relay 612, which in turn removes positive potential from the start lead 629, thereby bringing about the release of relays 704, 705, and 706, respectively.

The relay 706 of the sender, upon deenergizing, opens the locking circuit of relay 707, and of relays 710 to 718, respectively, which accordingly restore the sender completely to normal. The relay 711, upon restoring, also opens the locking circuit of relay 708 so that this relay also restores.

Relay 718, upon deenergizing, at its lowermost contacts opens the circuit of the miscellaneous relay 604. This latter relay, upon deenergizing, at its upper contacts removes positive potential from the reset common conductor 630 of the tell-tale relay, at these same contacts opens the circuit of relay 614, and at its lower contacts removes positive potential from the lower terminal of relay 603.

As a result of the last mentioned function, the relay 602 is permitted to energize and lock-up in series with the relay 603 to positive potential supplied by way of the make contacts of relay 615. The relay 602, upon energizing, at its upper contacts removes negative potential from the locking circuit formerly including the tell-tale relay 618 and the miscellaneous relay 601, and these relays accordingly deenergize.

The miscellaneous relay 614 also deenergizes, as a result of the deenergization of relay 604, and will accordingly open the circuit of the relay 615. After a short interval the relay 615 becomes deenergized, and performs the following function: at its lowermost contact recloses the #1 line, and at its upper contacts opens the locking circuit of relays 602 and 603.

The reclosing of the #1 line causes the reenergization of the line relay 607 at the dispatcher's station, as well as of the line relays 207 of all field stations. The reenergization of the dispatcher's line relay 607 causes the release of the miscellaneous relays 608 and 609. The relay 609, upon deenergizing, removes positive potential from the hold conductor 625 extending to the incoming selector IS, and, accordingly, the counting relays formerly locked up thereto will also be deenergized.

The restoration of the miscellaneous relays 601 and 602 restore the supply of the negative potential to the tell-tale relay pick-up conductor 620, and the dispatcher's circuits are now entirely at normal.

*Additional tell-tale relay operations*

If it so happens that other operate keys are also operated by the dispatcher, previous to the completion of a code, the foregoing operations will be repeated, a new tell-tale relay coming up each time miscellaneous relay 602 restores its armature, until a code has been sent for each operate key that has changed position, the tell-tales coming up in succession, in the order of their nearness from the circuit standpoint, to the miscellaneous relay 601.

It may be well to mention here that any number of keys may be operated in rapid succession, or simultaneously, without in any way affecting the order of the function of the equipment. A single key may even be operated maliciously back and forth, any number of times, but when the last code has been sent and the last code received, the signals on the dispatcher's board will check with the final position of their operate keys, and the final position of the associated equipment in the field. This is true because the code registering tell-tale relay, upon operating, is freed of control by the key until the code initiated by its operation has been completely transmitted, and for the further reason that the other code registering relay of the same key has its operating circuit held open by the relay 601 until the initiated code has been fully transmitted. The same holds true for automatic signals from the field.

*From the field operation*

Since the total number of from the field indications will probably always exceed one-hundred, it has been necessary to provide an incoming selector IS which will respond to the first digit, and direct the remaining digits to the proper connector switch, such as D1. These connector switches consist of a mechanism only, there being no relays required.

In the process of a field station seizing the line, it will be remembered that the line was opened. When this happens, of course, the dispatcher's line relay 607 will fall away and cause the associated miscellaneous relays 608 and 609 to operate, and prepare the circuit to the incoming selector IS.

When the field station sends the preliminary pulse over the line, line relay 607 of the miscellaneous relay group will energize momentarily and close the circuit of relays 801 and 811 of the incoming selector by way of the inner-upper make contacts of relay 609, the operate conductor 627, the lower break contacts of relay 810 to the point 818 where the circuit branches, one branch passing direct to the relay 801 and negative potential, while the other branch extends by way of the lower break contacts of relay 804, and the upper break contacts of relay 812 to the winding of relay 811 and negative potential. The relay 801, upon energizing completes the energizing circuit of relay 802. This latter relay, upon energizing, at its lowermost contacts completes a circuit by way of the upper-break contacts of relay 804 for the relay 803. At the end of the pulse, relay 804 becomes energized in series with relay 803 from positive potential supplied through the lowermost contacts of the relay 811. The relay 804, upon operating, at its lower break springs open the pulsing circuit to the counting relays 811 to 814, inclusive, and at the lower make contacts closes a circuit to the motor magnet 815 of the incoming selector by way of the lower-make contacts of relay 812, the lower break contacts of relay 814, and the lower break contacts of relay 806, respectively. The relay 804 also at its upper make contacts extends its own counting circuit to relay 805.

It will be assumed that the field sends the code 134. The line relay 607 will, accordingly, momentarily energize once in response to the first digit, and will send one pulse to the magnet 815 of the incoming selector, which will advance its wipers 850 and 851 into engagement with their first bank contacts.

The relays 801, 802, and 805 will also energize as a result of this pulse, and at the end of the pulse relays 801 and 802 will deenergize as before, thereupon the relay 806 will become energized in series with the relay 805. The relay 806, upon energizing, extends the counting circuit to the counting relay 807, and at its lower contact transfers the operate conductor from the motor magnet 815 to the conductor 852.

The line relay 607 will now momentarily energize three times in response to the second digit of the code, and will send three pulses to the vertical magnet of the first connector over the pulsing circuit by way of the lower make contacts of relay 804, the lower make contacts of relay 812, the lower break contacts of relay 814, the lower make contacts of relay 806, conductor 852, the lower break contacts of relay 808, the wiper 851 of the incoming selector and its first bank contact, and the conductor 853 to the vertical magnet and negative battery of the first connector D', thereby elevating the wiper 525 of this connector opposite the third row or level of its bank contacts. Consequent to the transmission of the second series of impulse the relays 801 and 802 again become energized and also complete a circuit for the counting relay 807. Accordingly, following the transmission of the second digit relays 801 and 802 again deenergize with the result that the relay 808 becomes energized in series with the relay 807. The relay 808, upon energizing, transfers the counting circuit to the relay 809 and at its lower contacts transfers the operate circuit from the connection to the vertical magnet of the connector D' to the wiper 850, which is connected with the conductor 854 extending to the rotary magnet of the connector.

The line relay 607 will now momentarily energize four times in response to the third digit of the code and will send four pulses over the previously traced circuit to conductor 851, through the lower front contacts of relay 808, the wiper 850 and its first bank contact, conductor 854 to the rotary magnet of the connector, which will accordingly rotate its wiper 525 into engagement with the fourth bank contact in the third level of its bank. During the transmission of the third digit of the code, relays 801 and 802 again energize and the relay 802 in turn completes the circuit of counting relay 809. Accordingly, at the termination of the third digit the relays 801 and 802 again become deenergized with the result that the relay 810 becomes energized in series with the relay 809. The relay 810, upon operating, at its upper contacts opens the counting circuit, and at its lower contacts also opens the operating circuit.

As previously mentioned, the wiper of the first connector has now been brought into engagement with its thirty-fourth bank contact. As a further result of the deenergization of relay 802, following the transmission of the last digit, a circuit is now closed from positive potential through the lower contacts of relay 608, wiper conductor 628, the break contacts of relay 802, conductor 855, the connector wiper 525, the thirty-fourth bank contact of the connector, and the return-indication polar relay winding 526 to negative potential. The armature of the polar relay, accordingly, moves over to the left, thus extinguishing its green lamp G and lighting the red lamp R as an indication that the represented customer's relay has changed to the corresponding position in the field.

Upon the completion of the code from the field, the line again remains closed, whereupon all of the line relays again become energized. When the dispatcher's line relay 607 again remains energized the associated miscellaneous relays 608 and 609 become deenergized. As a result of this, the hold circuit is opened at the upper contacts of relay 609 and, accordingly, relays 811 to 814, inclusive, of the incoming selector IS, become deenergized. Upon the deenergization of relay 811 the holding circuit for the counting relays 803 to 810, inclusive, is also opened, with the result that these relays also become deenergized. The relay 609 also, upon becoming deenergized, at its inner-upper contacts supplies positive potential, through the make contacts of line relay 607, to the release conductor 626, through the off-normal springs ON2 of the incoming selector to the release magnet 816 thereof and negative potential, and also by way of the off-normal springs ON3 of the connector D' to the release magnet of this connector. As a result of this, the incoming selector and the connector will restore in a well known manner, and at their off-normal springs open their release circuits upon the completion of the release operation.

*Dispatcher's lockout*

In case a field station is using the line, the dispatcher's station is locked out, because of its miscellaneous relays 608 and 609 being in their operated positions. This prevents the closing of the circuit of relay 605 even though the relay 601 becomes operated, and therefore, the dispatcher's circuits cannot function.

*Simultaneous dispatcher and field operation*

In certain instances it may occur that a field station and the dispatcher's station both open the line at the same time. In such an event the field station is locked out by virtue of the fact that the line is opened at the dispatcher's station.

Since the line is opened at the dispatcher's station, the field station preliminary pulse is without effect on the line, and the field miscellaneous relay circuit restore, as previously explained under "simultaneous field operation."

Since the line is also opened at the field station it is important that the dispatcher's sender does not start sending until the field circuits have been completely restored to their waiting position. This is the reason for the provision of delay relays 611 and 612 of the dispatcher's miscellaneous relay group and of relays 704 and 705 of the sender. These relays also allow a sufficient time interval between the seizing of the line and the start of the code to permit any field station which may have seized simultaneously to get into the clear, and restore its miscellaneous relay 210.

*Automatic indication*

The indications from the field stations may be divided into two classes, first, indications which return as the result of an operation brought about by the dispatcher, and second, automatic indications which occur as the result of some change in the field not originated by the dispatcher.

This latter type of indication is required in railroad practice to give a train dispatcher an indication of a train having run in on a siding, and is commonly known as on O. S. indication. It sometimes is desired that an indication of this character be "locked", even though the change in the field is only momentary. To accomplish this the lock-in key K is provided on the dispatcher's board.

It may also be desirable, in certain instances, to obtain a printed record of the time of operation in making this automatic indication. This is arranged for by the provision of pairs of relays 501 and 502 placed intermediate to the contacts on the automatic indication polar relays and their indicating lamps.

It will be assumed that a "from the field" code causes the first connector to position its wiper upon its eleventh contact and thereby causes the automatic indication polar relay winding 528 to move the associated armature to the right. The relay 502, accordingly, becomes deenergized. With the armature of winding 528 in its new position a circuit is completed to the slow-to-operate relay 501. Since this relay is slow-to-operate a continuation of the circuit momentarily extends through its break contacts to the printer and back through the break contacts of relay 502 and the winding of this relay to negative potential. The printer will, accordingly, operate and, after a delay, the relay 501 will then operate and open the circuit of the printer, and at its upper contacts close the circuit of the associated lamp.

If the locking key K is in its operated position the relay 501 remains locked up, instead of becoming deenergized when the polar relay again changes its position.

Obviously, if the armature of the polar relay is in the position opposite to that shown and its winding 529 is selected, the armature will be restored to its shown position. In this case, the circuit of relay 501 is interrupted and that of 502 again completed. However, prior to the opening of the contacts of this relay a circuit will again be established for the associated printer.

What is claimed is:

1. In a switch control system, a dispatcher's station, a field station, a line connecting said stations, a movable device at said field station, means for moving said device, a relay having a single winding and a make-before-break contact combination, an operating circuit for said relay closed consequent to the movement of said device and including said winding and the break contacts of said combination, a locking circuit for said relay closed by its operation including said winding and the make contacts of said combination, a second relay included in said locking circuit and energized in response to the closure of said locking circuit, a sending switch for transmitting pulses over said line, set into operation by said second relay, means controlled by said first relay for determining the code transmitted by said sending switch, equipment at the dispatcher's station responsive to said pulses to register the change in position of said device, means associated with said sending switch for interrupting the locking circuit of said first relay only after the transmission of the entire code to restore said first relay and its contact combinations, and means operated in response to the energization of said second relay and thereafter controlled by said device in its moved position for opening said operating circuit to prevent the reoperation of said first relay over said operating circuit while said device remains in its moved position.

2. In combination, a plurality of pieces of equipment, connectors having contacts and wipers for controlling said pieces of equipment, a transmission line with which said connectors are associated, means located at a remote point for impressing control signals on said line, means responsive to such signals to position the wipers of one of said connectors into connection with a desired piece of equipment and to operate it, indication transmitting apparatus controlled by the device operated to impress indication control pulses on said line, code switches at the remote point responsive to said pulses to indicate a change in position of the equipment, means for always transmitting a single preliminary pulse over said line preceding the transmission of an indication signal thereover, means responsive to said preliminary pulse to lockout and prevent a control signal being sent out while indication pulses are being transmitted, means for always transmitting a plurality of preliminary pulses over said line preceding the transmission of a control signal thereover, and means responsive to said preliminary pulses to lockout and prevent indication impulses being sent thereover while control impulses are being transmitted.

3. In a dispatching system, a dispatcher's station, a plurality of field stations, a line connecting said stations in serial relation, pieces of equipment at each field station, a code responsive switch at each field station having access to its pieces of equipment, an operating circuit associated with each of said switches, position indicating control means at the dispatcher's station for each of the respective pieces of equipment at the field stations, a code responsive switch at the dispatcher's station having access to said control means, means at the dispatcher's station for transmitting a plurality of preliminary pulses to said line, a controlling relay at each field station included in said line and responsive to all impulses transmitted thereover; an operating circuit at each station for its code responsive switch; means at each field station responsive to the operations of its controlling relay, when responding to a plurality of preliminary pulses, to prepare the operating circuit of its associated switch; means at the dispatcher's station for then transmitting a code over said line to actuate said controlling relays and through one of them position one of said switches into connection with the piece of equipment represented, means operated consequent to a change in the position of a piece of said equipment for transmitting a single preliminary pulse over said line, means responsive to such pulse to prepare the operating circuit of the dispatcher's code responsive switch to the exclusion of the code responsive switches of the field stations, and means for then transmitting a code of impulses to said switch to select and operate the indicating signal of the repositioned piece of equipment in the field.

4. In a selective signalling system, a dispatcher's station, a plurality of remote stations, a line circuit joining the stations including a line relay at each station and a source of current supply, units of equipment at each remote station transmitting means in the remote stations for transmitting over said line circuit, normally inoperative selecting means in said remote stations for selecting said units, means at the dispatcher's station for transmitting a code of impulses over the line in all instances including a pair of preliminary lockout impulses followed by a plurality of series of selecting impulses, means in the remote stations responsive to the lockout impulses of the code for locking out the transmitting means at each remote station to prevent transmission therefrom and for rendering said selecting means operative to receive the selecting impulses of the code, and means thereafter responsive to the selecting impulses of the code for operating said selecting means to select and operate a particular unit at one of said stations.

5. In a selective signalling and remote control system, a dispatcher's station and a plurality of remote stations joined by a line circuit, devices at the remote stations and the dispatcher's station, selecting means at each station for selecting a particular device, a code sender at each remote station for transmitting a code of pulses over the line circuit to select a device at the dispatcher's station, means in said sender always transmitting a preliminary pulse over said line; means at other of the remote stations, responsive thereto to lock out such other of the remote stations, means at the dispatcher's station responsive thereto to render the selecting means at the dispatcher's station operative, a code sender at the dispatcher's station, means in said last sender for always transmitting a pair of preliminary impulses, said previously specified preliminary impulse responsive means operating in response thereto to render the selecting means at the dispatcher's station inoperative and the selecting means of the remote stations operative.

6. In a selective signalling system, a dispatcher's station, a plurality of remote stations, a line circuit joining the stations, units of equipment at each remote station, means at the dispatcher's station for transmitting a code of impulses over the line circuit in all instances including a pair of preliminary impulses followed by a plurality of series of selecting impulses, selecting means in the remote stations for selecting and operating said units, said selecting means at all said remote stations normally inoperative, means in the remote stations responsive to said preliminary impulses of the transmitted code for rendering all said selecting means operative, and means thereafter responsive to the selecting impulses of the transmitted code for operating said selecting means at all said stations to select and operate a particular unit at only one of said stations.

HARRY E. HERSHEY.
ALFRED H. BELLIVEAU.